United States Patent [19]
Eisler

[11] 3,897,928

[45] *Aug. 5, 1975

[54] MOLD HAVING ELECTRICAL HEATING FILM FOR TREATING CAST MATERIAL

[76] Inventor: Paul Eisler, 57 Exeter Rd., London, N.W. 2, England

[ * ] Notice: The portion of the term of this patent subsequent to May 5, 1987, has been disclaimed.

[22] Filed: Sept. 15, 1972

[21] Appl. No.: 289,346

Related U.S. Application Data

[63] Continuation of Ser. No. 12,957, Feb. 20, 1970, abandoned, which is a continuation-in-part of Ser. No. 549,681, May 12, 1966, Pat. No. 3,283,284.

[52] U.S. Cl. ............................... 249/78; 338/212
[51] Int. Cl. ................................. B28b 21/78
[58] Field of Search ....... 249/78; 338/212; 219/528; 117/235

[56] References Cited
UNITED STATES PATENTS

| | | | |
|---|---|---|---|
| 2,600,486 | 6/1952 | Cox | 338/212 |
| 2,971,073 | 2/1961 | Eisler | 338/212 X |
| 3,185,432 | 5/1965 | Hager | 249/116 X |
| 3,235,427 | 2/1966 | Koritz | 117/235 X |
| 3,283,284 | 11/1966 | Eisler | 338/212 |
| 3,510,547 | 5/1970 | Eisler | 264/33 |

*Primary Examiner*—Robert D. Baldwin
*Attorney, Agent, or Firm*—Laurence R. Brown, Esq.

[57] ABSTRACT

Electrical heating of a body of curable material (concrete or plastic) the solidification of which can thereby be accelerated, is effected by an electric resistance heating film in extended form in good heat conductive contact with the body and energized according to a predetermined law. The film may be on or near the surface of the body and escape of heat away from the body hindered by thermal insulation or the atmosphere. The body is usually held in a mould which may be pre-hardened plates of the material. For bodies of irregular shape the film may be embedded in skeletal eg. tree-like form. In large structures the film may be in voids between large aggregate and the curable material pumped into the voids.

5 Claims, 32 Drawing Figures

PATENTED AUG 5 1975 3,897,928

SHEET 1

INVENTOR
Paul Eisler
BY Laurence R. Brown
ATTORNEY

INVENTOR
Paul Eisler
BY
Lawrence R. Brown
ATTORNEY

INVENTOR
Paul Eisler
BY
Lawrence R. Brown
ATTORNEY

INVENTOR
Paul Eisler
BY
Lawrence R. Brown
ATTORNEY

MOLD HAVING ELECTRICAL HEATING FILM FOR TREATING CAST MATERIAL

This is a continuation of application, Ser. No. 12,957 filed Feb. 20, 1970, now abandoned, which application is a Continuation-In-Part of my application Ser. No. 549681 filed May 12th, 1966 for Electrical Heating Film, since matured into Pat. No. 3,283,284.

The present invention relates to electric heating by means of a heating film, that is to say, a thin, usually flexible structure incorporating at least one electrically conductive layer which is so thin that its thickness is minute compared with its surface dimensions, the layer incorporating or being provided with terminal areas accessible at the boundarieis of the film, the terminal areas and the nature and or patterning of the conductive layer being such that when the terminal areas are connected to a supply of electric current, the current flow and distribution produce a substantially uniform heat distribution over at least predetermined zones of the area of the film.

For the purpose of the present invention the film is preferably designed so that the desired rate of heat dissipation is obtained when a low voltage supply is used. By low voltage is meant a voltage which is not dangerous if human contact is made with the conductive layer, which in practice generally means a voltage below 50 volts. A low voltage has advantages for the present purposes, which will be pointed out later, which are quite additional to the safety aspect.

The conductive layer of the heating film could consist of a high resistance material such as carbon or graphite uniformly distributed on a thin support layer of insulating material such as paper, or between two such layers with terminal zones of metallic foil so that over any terminal zone the potential is sensibly the same. Alternatively a carbon film (provided with terminal zones of metallic foil) might be used, that is a film made from carbon by processes similar to paper making or by processes of weaving or felt making similar to those used with asbestos, as described in my application Ser. No. 368,544 filed May 19th, 1964, for Electric Batteries since matured into U.S. Pat. No. 3,390,014. A simple example of such a film using carbon as the conductor would be a rectangular carbon film with a terminal zone over the whole length of two opposite margins. Then even though connection to the supply were made at small areas of the two terminal zones, each of the two terminal zones would be at the same respective potential and the current flow would be substantially uniform across conductive layer from one terminal zone to the other, and the heat development would be uniform over the whole area. Usually, however, the conductive layer of the heating film will contain a pattern of parallel metallic foil strips or arms. Thus terminal zones of foil extending longitudinally (for example along the two opposite margins) may have integral strips or arms extending laterally, the strips or arms on one terminal lying between those on the other, leaving gaps between them which are bridged by carbon or graphite, so producing a uniformly distributed conductive pattern of appropriate resistance; the whole being supported on a sheet of insulating material or more usually between two such sheets. An example of such a pattern is to be found described with reference to Figure II in my U.S. Pat. No. 3,033,970.

It is preferred, however, to make the whole conductive layer of terminal zones and a pattern of parallel strips or arms which form conductive paths between the terminal zones, in particular a meander pattern consisting of substantially parallel conductive arms with narrow elongated insulating spaces between the arms and bridges joining the ends of the arms, which is so thin that the thickness is minute compared with the surface dimensions while the pattern is distributed over and occupies the area from which the heat is to be dissipated, insulation being provided on one or both faces and/or in the spaces between the arms. Such a conductive layer is desirably made from metallic foil, especially aluminum foil or steel foil, and a preferred construction of such a film is described in the parent application Ser. No. 165,736 now U.S. Pat. No. 3,283,284 aforesaid while methods and apparatus for making it are disclosed in my application Ser. No. 510,278 filed Nov. 29, 1965 now U.S. Pat. No. 3,408,735 for manufacture of Patterned Webs.

An electrical heating film as defined above can be made thin, flexible, and inexpensive and of extremely wide application in that it can be placed almost anywhere within or on the boundary of any space or substance as an instantaneous and homogenous source of heat of any desired temperature below that at which the material or materials used in the essential structure of the heating film itself would melt or be destroyed. The space required for the heating film is so negligible in view of its thinness and the cost of the heating film per unit area in most constructions is so low, namely of the order of that of normal dispensable packaging material, that there is no substantial spatial or economic reason in almost any field of use of the film for restricting the heat emitting area constituted by the area of the film. This use of a large area of heating film again permits the desired quantity of heat energy to be emitted at the lowest useful temperature.

The present invention is concerned with the heat treatment of a body of a curable structural material the solidification of which can be accelerated by heat. Solidification may be defined for the present purposes as an increase in viscosity of a substance which starts in fluent or readily deformable condition and finishes in a condition which is solid at least for practical purposes. According to the nature of the substance the cure may then proceed by a gradual increase in viscosity, but with many substances the increase is not uniform but tends to accelerate during the last stages. Two important classes of structural material with which the invention is concerned are concrete which is used in building, civil engineering and similar operations, and so-called plastics materials, especially reinforced plastics materials, such as fibre-glass-reinforced synthetic resins which as well as being used in building, civil engineering and similar operations whether as part of the final structure or as formwork in such operations, are used for a wide range of other purposes such as production of hulls and other parts of boats, road, rail and air vehicle bodywork and equipment, tanks and containers, chemical plant electrical, industrial, domestic, sports and display equipment. The term viscosity is used herein in a broad sense, in that the materials with which the invention is concerned are not Newtonian liquids. This is especially so as regards concrete which when mixed is readily deformable without being fluent though it becomes fluent when disturbed as by vibration, but even so is far from a liquid.

While substances of the kind in question are being cured they are usually occupying a mould structure (which term includes formwork or shuttering), and even if not as in the case say of concrete laid in trenches or excavations which in effect constitute a mould structure which confines it to the foundations of buildings, roads, or the like, no further progress with the work can be made until the moulds have been separated from the material, or the material in the trenches or excavations has hardened sufficiently to withstand the loads imposed by further steps in the building or civil engineering operations.

It is well known that the curing operation can be accelerated by heat, and the use of electrical heating elements for example of wire or constituted by the metallic reinforcement in concrete has been proposed. Such devices even though distributed through the material constitute localized heat sources of comparatively small area spaced well apart so that the dissipation of heat is far from uniform and for a given rate of dissipation necessitates a relatively high surface temperature, while when the reinforcement is used it has the further shortcoming that its location is dictated by its primary function and this may be far from the best from the point of view of heating. Also such elements have a high thermal inertia so that control of dissipation by control of energy supply can only be imprecise and sluggish.

It has also been proposed to accelerate the setting of concrete by passing an electric current through the material itself but the electrical properties of concrete prior to and during curing are not at all convenient or even suitable for the purpose.

The present invention is based on a recognition of the fact that the properties peculiar to an electric heating film of the character above set forth render it a vastly superior heating element for accelerating the hardening of a curable structural material than those proposed hitherto.

First it has a very low thermal inertia so that control of the dissipation of heat is practically instantaneous and accurate.

Second when in extended form it is a surface heating element, that is to say heat is dissipated from its substantially uniformly over the whole area occupied by the conductive layer and in a direction generally perpendicular to its surface; the interruptions in the conductive layer due to the meander pattern of arms separated by narrow elongated insulating spaces present in the preferred type of film still leave the conductive foil occupying by far the greater part of the total area in a uniformly distributed fashion and in any practical case the width of the individual arms and spaces is but a minute fraction of the width of the film so that the patterning does not detract from the substantial uniformity of generation and dissipation of heat over the whole area. This not only provides uniformity of heating which can be remotely approached by wire or rod elements with their small surfaces and wire spacing, but on account of the large emitting area compared with that of wires or rods also enables much higher dissipation of heat to be achieved with a much lower surface temperature and a minimum temperature gradient between the film and the material than with other elements, and especially without the production of hot spots which could leak to damage to the film or local over-rapid hardening of the material due to variation of temperature in different zones of the material. Thus the cure is faster more uniform and the heat generated is more efficiently used.

In the case of such materials as concrete, the hardening reaction is exothermic, and though the control of dissipation of heat by the film by regulating the supply of energy to it at the start effects immediate control in the thin layer of material immediately adjacent the film which owing to the surface nature of the film is a continuous layer over the whole area and which can be rapidly hardened, as the hardening continues the heat from the film has to travel further through the hardened layer and is delayed while the heat developed by the reaction adds to that dissipation by the film and begins to outweigh the latter. The energization of the film can therefore be reduced, but with a film, due to the wide area of generation with a substantially uniform surface distribution and its dissipation in a direction generally perpendicular to the film, hardening will still continue under orderly propagation of heat from the layers nearer the film to those further away and until the heat of reaction completely preponderates, the effects of it can be taken into account with some precision in determining the law according to which electrical energy is supplied to the film.

A further contribution to efficiency which can be achieved with a film is the avoidance of wastage of heat, which in the first place requires good heat conductive relationship of the film to the body of material. To ensure even cure throughout under controlled conditions in many cases, especially when the body is of uniform thickness, the film should be at most not far from the surface of the body of material so that at least the main bulk of the body is to one side of the film, though it may be supplemented by another film or films within the body. If the film on or near the surface extends as is preferably over the whole cross section of the body and any films within the body also so extend and are parallel the heating will be substantially uniform in cross-sections parallel to the film or films and it will progress in a uniform manner normally to the film or films as above described. In addition conductive transmission of heat over the whole area of the film which is near the surface of the body of material in a direction away from the main bulk of the material needs to be hindered if waste of heat is to be avoided; then when the film is supplied with electrical energy, the heat will be dissipated preferentially and in a controlled manner both in time and spatially into the main bulk of the body of material.

Such hindering of the transmission of heat in the undesired direction can be achieved by disposing the film externally of the body and covering it on the outside over its whole area with a layer of good thermal insulation. External application of the film is simple and very convenient when the material is in a mould structure, as will be described more fully later. In the cure of concrete the unhardened mixture is of high thermal conductivity so that with an extremely disposed film the atmosphere itself will serve as an adequate thermal insulator. The film itself (which usually has the conductive layer sandwiched between two others) may be incorporate good thermal insulation on one side of the conductive layer and be positioned with this thermal insulation on the side away from the main bulk of the material. In some cases it may be desirable to dispose the film within the body of material near to an external surface. Then there will be a thin layer on the back of it which will rapidly harden but the atmosphere or applied insulation which may be consituted or supported by the mould structure will harden outward dissipation and preferential dissipation towards the main bulk of material will still be obtained.

Cases arise in which heating by an extended film from the surface or near the surface does not result in an evenly timed cure throughout, for example where the thickness through the body from one external surface to the opposite surface varies substantially from one end of one such surface to the other. Then while still maintaining the film extended, it can be disposed within the body in a skeletal form, the film being treated to ensure cohesion and adequate adhesion or being apertured so that the material itself can extend through the skeleton or bind with a prehardened insert therein of the same material to avoid the production of an internal area of weakness, the form of the skeleton being such as will provide some approximation to equal distances for the heat to travel from the film to the external surfaces on either side. Another case in which similar problems arise along with others is the construction of large and solid works such as dams, in which case heating films in extended form brought into a skeletal form are placed within a mould, surrounded with large aggregate so that only narrow voids are left and the voids are filled with the uncured material before energization of the film.

Provision can be made in the form of a viewing box enabling preliminary investigations to be made in any particular case. This applies especially to cases where films are embedded and where they take a skeletal form.

In many cases the body of curable material will be supported in a mould structure during at least the preliminary stages of heat treatment though in some cases the mould structure may be removed after the material has hardened sufficiently not to need its support, leaving the film behind when the heat treatment is continued by continuing the supply to the film.

Considering first the case of concrete, it must be kept in mind that the setting of concrete is a chemical reaction which can be accelerated by heat very drastically. This acceleration has bascially nothing to do with evaporation of water from the cement slurry into the air. It is a hydration process of some complexity and the reaction is exothermic, i.e. it produces itself heat which raises the termperature of the mass and must eventually be dispersed from its surface.

Various aspects of this reaction will be considered in the present application; accelerating the reaction being the first and overriding one. Any method of heating would achieve a speed-up of the reaction, but the use of electrical heating film has the advantage of adaptability and its flexibility to desired time cycles.

The use of a hearing film has the great advantage that the rate of heat dissipation e.g. in watts per square foot can be varied by varying the voltage of the supply or by varying the scheme of connections, for example by series of parellel connection in various groupings and in this way a desired variation in relation to time be effected. A convenient approximation can be obtained by relating the temperature of the film to time. The very low heat inertia of the film contributes to accurate control. Variations can be effected automatically for example under the control of a device ("Simmerstat") responsive to heat dissipation or a thermostat or a time-switch arrangement. In some cases pulsating energization may be used. Shortly stated, by causing the energy supplied to the film to vary according to a determined law, owing to the nature of the film the heat dissipated by it will substantially follow that law. These schemes apply not only to concrete but also to other materials within the scope of the invention.

The invention will be further described with reference to the accompanying diagrammatic drawings in which the thickness of the heating film usually has to be exaggerated for the sake of clarity.

FIG. 3 illustrates the application of the invention to a foundation for a building, road or the like.

Figure 1:
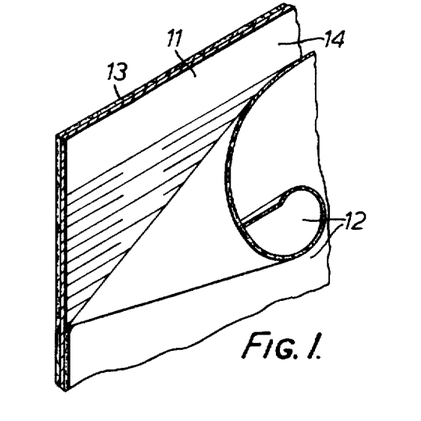
FIG. 1 illustrates the structure of one type of heating film which can be used in practising the invention.
Figure 2:
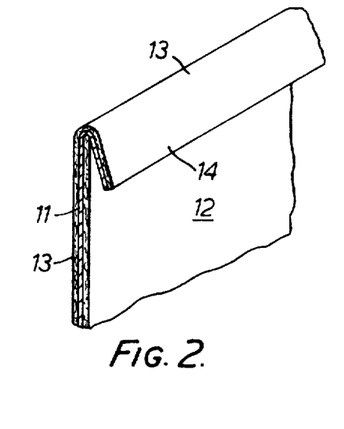
FIG. 2 shows the film of FIG. 1 with a busbar folded over.

The heating films shown by way of example in FIG. 1 is a three-ply laminate comprising a meander-patterned metallic foil 11 (say aluminum) between two papers 12, 13. Opposite wide margins of the foil, one visible at 14, are unpatterned and bare on at least one surface to constitute busbars and are folded over as indicated in FIG. 2 in which the bare metallic surface is on the inside, the paper layer 13 overlying the busbar. The meander pattern presents a multitude of similar electrical paths in parallel between the two busbars and when connection is made to a supply through the busbars a substantially uniform current distribution and therefore heating effect is obtained over the whole patterned area.

Figure 3:
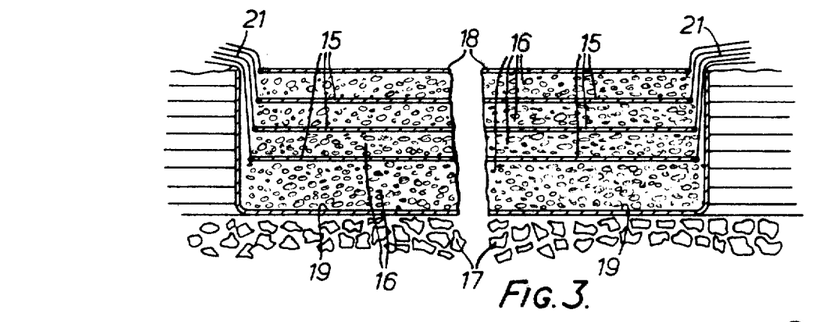

As shown in FIG. 3 films such as that shown in FIG. 1 can be placed as at 15 within the cross-section of a concrete layer 16 such as the layer within a trench on a foundation 17 in planes parallel to the surface and extending substantially over the whole cross-section and/or on the surface as at 18. The films can be placed at any convenient time prior to, during or after the pouring and vibrating of the mixed concrete. A film may also be placed as at 19 directly on the foundation 17. Connections can be taken out for supplying the films at the sides as indicated at 21. Undue loss of heat upwardly from the film 18 is avoided by the much lower thermal conductivity of air than of concrete. In the case of the film 19 a film may be used incorporating a layer of thermal insulation, the film being dispersed with this layer on the outside.

A similar arrangement using an open-topped mould structure can be made for lift-up systems of slab production.

The foundation 17 may be for a building or it may be for a road, runway or the like. Films may similarly be placed in natural or manufactured mould structures during the building or prefabrication of drainage and other channels and pipes and other structural or wall or pillar forming materials whether reinforced or not. Other examples are reinforced or prestressed structural frames and flooring units, beams and smaller structural units ranging from fence posts, lintels, railway sleepers, lighting columns, facing slabs, cast stones or larger products such as manholes and gullies. Further developments in which the film is embedded in the concrete will be given later.

Figure 4:
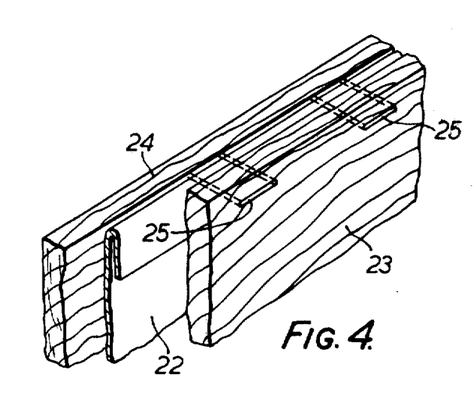
FIG. 4 illustrates the use of the heating film within the wall of a mould or shuttering.

With structures for which a mould (formwork or shuttering) is required, the film can be used within the shuttering or as a kind of building paper. Thus it can be a layer laminated within the shuttering boards or be used on the inner surface of the shuttering boards or be laid within the cross-section of the concrete structures near the surface or near the surface and elsewhere. When a shuttering of timber, plywood or plastic faced boards is to be used, as shown in FIG. 4 the heating film 22 can be placed between two thicknesses of board 23, 24 and laminated together with these boards by bonding both surfaces or sticking one or both surfaces of the film to them. It is, however, preferable to enclose the heating film between the two boards and simply nail, screw or staple, or otherwise fix the two boards together along their long edges. The nails screws or staples 25 can peirce the heating film without causing shorts, as the film is disposed with the busbars and meander arms running parallel with the long edges of the board, and pins, nails, screws or staple limbs piercing the foil are therefore at the same potential.

Figure 5:
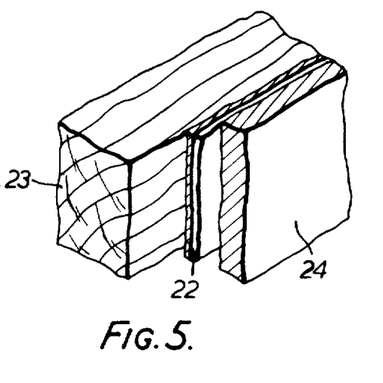
FIG. 5 illustrates an alternative to FIG. 4.

In FIG. 4 the boards 23, 24 are of equal thickness. The atmosphere may be relied on to check outward loss or a film incorporating a thermally insulating layer on the outer side may be used, but preferably, as shown in FIG. 5, the board 24 contacting the concrete is thin to improve heat conduction towards the concrete and well impregnated, or faced with a non-water-absorbent layer (paper-resin laminate), expoxy resin coated and impregnated glass cloth, etc. so as to stand a relatively large number of uses while the thicker board 23 is the backing and not in contact with the concrete.

The alectric current is conducted to the heating film from the low-voltage secondary winding of a mains transformer via tape cables with foil conductors, preferably aluminum foil conductors, and enters the film by terminals anchored in the thicker board at a convenient place along the long edge of the board, usually at one or both of its ends.

Figure 6:
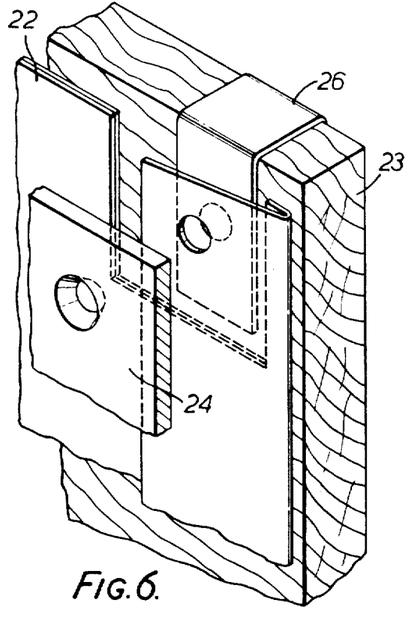
FIG. 6 illustrates one way of taking the supply to the film in a mould as in FIG. 4 or 5.
Figures 7, 9, 10, 11:
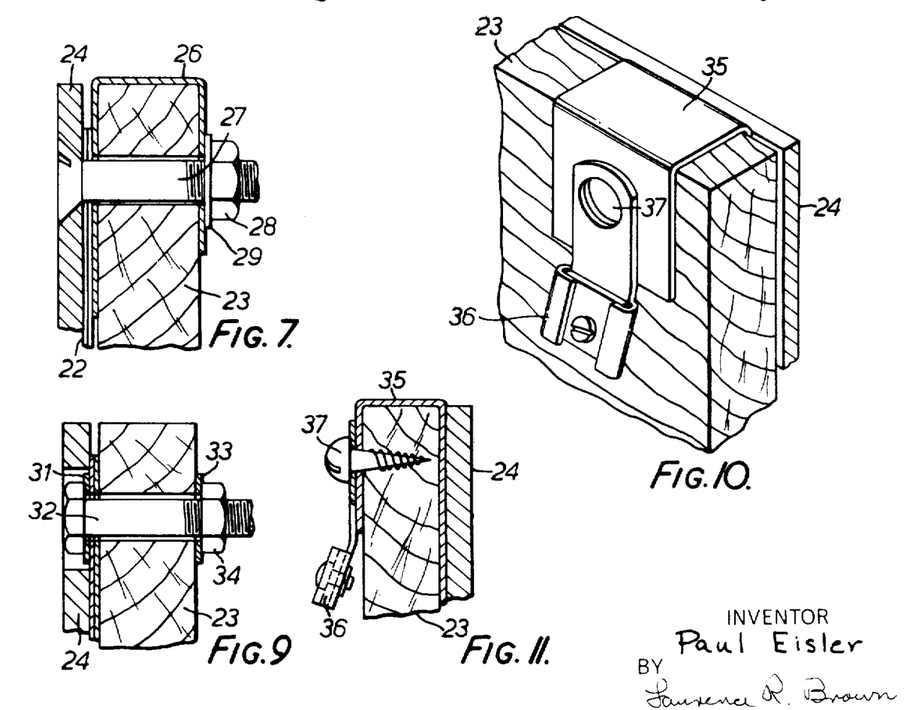
FIG. 7 is a section of FIG. 6.
FIGS. 8 and 9 are similar views to FIGS. 6 and 7 of an alternative way of making connection to the film.
FIGS. 10 and 11 are similar views to FIGS. 6 and 7 of yet another alternative way of making connection to the film.

There are several constructions of terminals, but one of the simplest shown in FIGS. 6 and 7 is achieved by slipping U-shaped metal clips 26 over the shorter edge of the backing board 23 in contact with the bare foil busbar 14 within the folds of the film margin. By bolting the clip to the board by a bolt 27 and nut 28 pressure is exerted on the clip 26 and foil-busbar 14 as well as on the clip 26 and a current-feeding foil-lead 29 over a large area, as is desired for the low-voltage, high-current conditions of running of the heating film.

Figure 8:
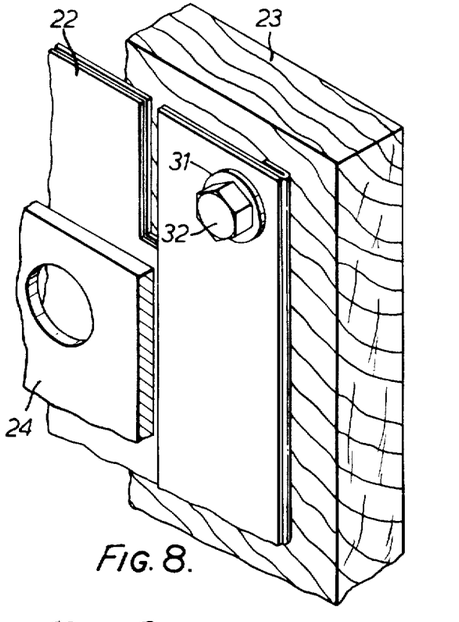

Another form of terminal is shown in FIGS. 8 and 9. Here the film is folded to ring the bare busbar 14 on the outside of the film and a washer 31 under the head of the bolt 32 makes good surface content over a large area with the busbar and the bolt 32 itself serves to carry the current from the foil lead 33 engaged by the nut 34.

Yet another form of terminal is shown in FIGS. 10 and 11. Here the film is assumed out from a supply of material, with busbars extending beyond one end of the general area of the film. These busbars are folded to bring the bare metal on the outside as in FIGS. 8 and 9, and the extra length then folded over the board 23 as at 35 and a screw terminal 36 shaped to receive and hold a tape supply cable is held in good contact with the busbar 35 by a wood screw 37.

If the shuttering is of steel, or if other metallic moulds are used the heating film can be stuck to or held under pressure against the outside surface of this formwork, the paper surface of the heating film serving as electrical insulation against the metal sheets or moulds. Care must be taken to insulate the terminal clips or bolts from the steel or other metallic formword. The metallic mould readily transmits the heat to the concrete while the atmosphere hinders outward loss of heat or the film may incorporate thermal insulation on the outside.

The life of the various constructions of shuttering in use at present, i.e. how often the shuttering can be used, depends to a great extent on the degree of absorption of the facing of the shuttering, its abrasion resistance, robustness, and the care with which it is handled, cleaned and coated. When the heating film is positioned within or on the outside of the mould or shuttering the life of this formwork is not much affected.

Figures 12, 13:
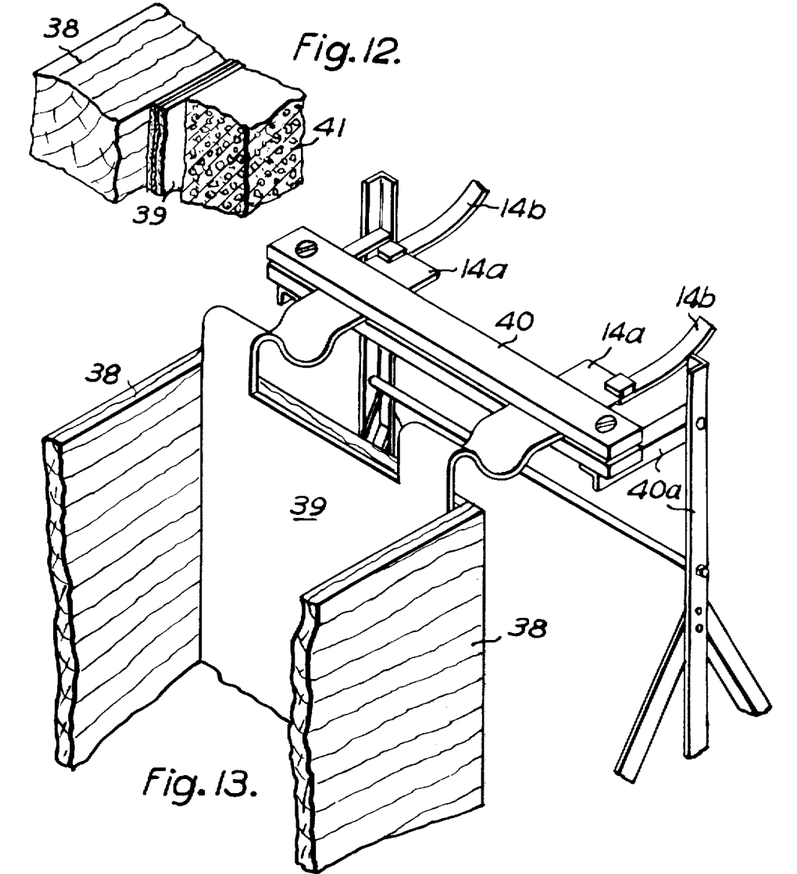
FIG. 12 illustrates the use of the film on the inside wall of the mould.
FIG. 13 illustrates one way of taking the supply to the film from the inside of the mould.

An entirely different aspect prevails, however, if as in FIG. 12 the heating film itself is used as the inside facing of the formwork 38, the film 39 being directly in contact with the concrete 41. This is a preferred use of the heating film, and this use is rendered economic by the low cost of the heating film which makes it a dispensible article which can be thrown away after only one or a few uses. The labour of laminating the film between shuttering boards is saved and the film is simply placed or lightly fixed on the inside surface of the mould or shuttering. The material of the mould or shuttering serves as thermal insulation or additional thermal insulation quite apart from the effect of the atmosphere.

If at least one surface of the heating film is covered with a low melting point pressure-sensitive or dry adhesive, such as a low melting point hot-melt adhesive or a wax, the fixing of the heating film to the shuttering board can by very conveniently effected and the adhesive or wax will be liquid and act somewhat as a lubricant while the hot heating film is being separated from the board. For attachment to steel moulds the heating film may be covered with a layer or layers containing permanent magnetic particles such as ferrites, after the fashion of pigments in a varnish coating. These layers act similarly to dry adhesive layers in causing the heating film to adhere to the steel mould but allow it to be readily shifted by sliding along the steel surface. The adhesive force of these permanent magnetic layers will be all the greater if the heating film embodies a steel foil pattern instead of the usual aluminium foil pattern. The permanent magnetic layers as well as the heat sensitive adhesive layers are of use not only for affixing the heating film to complete moulds but also for laminating it to steel sheets or between boards which form parts of the mould structure. With these provisions the adhesive layer at least at an elevated temperature offers a smaller resistance to forces parallel to said layer than to forces perpendicular to said layer at the temperature which the part of the mould structure has when the heating film is affixed to it.

The heating film produced for this mode of use is of the substance of a strong building paper and consists, as before, essentially (apart from the adhesive layer if used) of thre layers, the centre layer being a patterned metallic foil. One at least of the outer layers is preferably a packing paper or an even more robust paper, and the other layer is or comprises either a coated paper, a plastic film (for instance a polythene or polypropylene film) a coated foil, or a combination of these materials, making the heating film a reliably abrasion-and-moisture-proof, highly polished interlayer for at least one use. The plastic film or a coated metal foil makes it impermeable and offers an extremely smooth skin to the concrete.

The heating film therefore not only preserves the life of the shuttering, and saves labour and cleaning, but also gives a better result because of its lack of absorption, better heat transfer to the concrete and lower heat loss, the total thickness of the shuttering being kept dry and acting as thermal insulator. The concrete sets with a smooth surface and the layers near the film are soon firm enough not to require the mechanical support of the formwork any longer. They can withstand unsupported the pressure from the much less cured concrete inside the structure.

If the shuttering has the heating film laminated within its layers or stuck to its outside the removal of the shuttering also removes the source of heat and of the acceleration of the curing. If, however, the heating film is placed on the inside of the formwork, the shuttering or mould can be removed while the film remains on the concrete, heating it further and also preventing it from drying out. Thus the acceleration of the curing continues while the shuttering or mould can already be used elsewhere and the structure can remain under an impermeable cover for as long as desired. Thereafter the plastic film or coated foil surface of the heating film permits its being readily stripped off the concrete. As shown in FIG. 13, the foil conductors of the tape cables 14b feeding the heating film 39 are in this example directly connected to the busbars 14a of the heating film 39 and not through bolts fixed in the shuttering, but provision is made to secure the tape cable mechanically near the terminals independently of the shuttering, for example by a clamp 40 supported by a framework 40a of angle iron or the like.

The previous figures have all assumed that the heating film is supplied in a width to be used in single pieces. However for economic reasons it is desirable to produce the film in a few standard widths or perhaps only one width in lengths only limited by the lengths in which the materials of which it is made are available, whereas the mould structure may be of any size and of a size which may not be of any particular standard. Such standard widths of films desirably have the busbars such as 14 above described disposed so that several widths of film can be inter-connected edge to edge.

Figures 14, 15, 16, 17, 18:
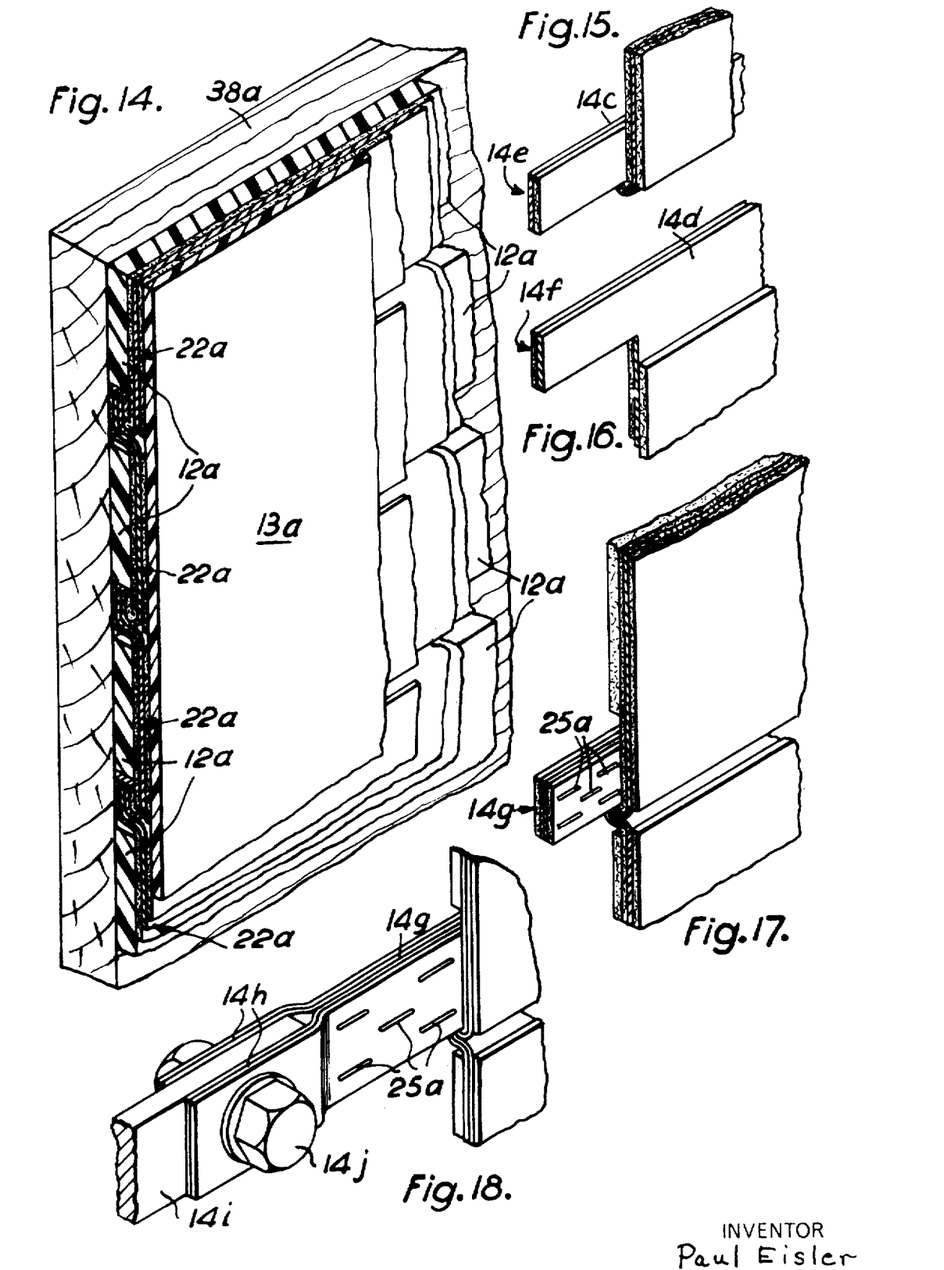
FIG. 14 illustrates a film made up of narrower standard widths.
FIGS. 15 to 18 are details of FIG. 14.

Thus as shown in FIG. 14 which corresponds in some ways to FIG. 5, widths 22a of film having a busbar margin along one edge folded over and bared at 14c on the outside, FIG. 15, and a busbar margin 14d, FIG. 16, along the other edge bared on the opposite side. If a number of widths are disposed so that the bared busbar 14c of one overlaps and is pressed into contact with the bared busbar 14d of the next width, at least at intervals, the overlapped busbars are electrically interconnected. Where the films are mounted between boards as in FIGS. 4 and 5 this contact pressure could be achieved by the nails, screws or staples being driven at the appropriate positions, but it is preferred both when the films are between boards and when they are on one face or the other of the mould structure, to carry the busbars beyond the ends of the width of film as at 14e, 14f, FIGS. 15 and 16, and only secure these extended parts together as by staples 25a, FIGS. 17 and 18. If only interconnection is required the extended parts are cut off to leave short flaps 14g, FIG. 17, while if these flaps are to serve as terminals for external connection they are left full length, extending beyond the stapled zone, as at 14h, FIG. 18, to receive flat cable conductors 14i, connection pressure being applied for example by bolts such as 14j.

These overlapped margins locally increase the thickness and this can be compensated by providing each width with an insulating strip 12a, FIG. 14, of appropriate width and thickness; these strips can be applied during manufacture. On the other face there may be a single cover sheet 13a say of paper or plastic material covering the assembled widths. FIGS. 14 to 18 assume that these assembled widths are used in the inside surface of the mould structure 38a, but this mode of assembly can be used with film on the outside face or between boards or the like.

The continuation as above described of the accelerated curing by the heating film after demoulding adds to the advantages referred to above a very significant reduction in the number of moulds necessary for a given large output in a pre-casting plant of or formwork on site if a quicker cycle of use can be arranged.

It is advisable to secure the adhesion of the heating film to the concrete during the demoulding operation by taking care not to pull it off when moving the shuttering. In addition to such care temporary fixings, particularly on the edges of the film, can be provided to make sure that the film remains in position. After the removal of the mould or shuttering the film can continue the heat curing, and after it is switched off it can stay on the concrete as an impermeable cover preventing the loss of moisture from the concrete. Keeping the curing concrete wet is a very important function which this method of use of the heating film with its impermeable plastic film or coated foil as barrier fulfils in addition to accelerating the setting of the concrete and to providing it with a smooth facing.

In the example just given the barrier layer is positioned directly adjacent to the concrete surface, the patterned metal foil and the backing of the heating film follow and are followed themselves by the wall of the mould or formwork.

If the heating film is used the other way round and its structure slightly altered we have a building paper which permits more moist heat curing. In this case the heating film comprises a metal foil pattern carried by a paper which is heavily calendered on the outer side. The other layer sandwiching the foil pattern is a moisture barrier, i.e. a plastic film or metal foil coated with a varnish or paper to insulate it from the foil pattern. It is preferably only so lightly attached to the other layers that it can readily be lifted or stripped off when desired.

This heating film is laid on the inside wall of the mould or formwork with the calendered paper facing the concrete while the barrier layer is next to the wall of the mould or shuttering. A minute amount of water from the concrete mixture will be absorbed by the paper, but any other loss is prevented by an impermeable barrier layer. The low A.C. voltage supplied to the foil pattern is not short-circuited by the absorbed water, and when curing has progressed sufficiently to permit demoulding the barrier layer of the heating film which adheres to the concrete can be lifted; the paper be wetted thoroughly from the outside and the heating continued with the barrier layer put back over the wet paper and foil pattern.

Alternatively the barrier layer can be stripped off and replaced by a wet burlap itself covered by a plastic film, openings being provided whereby water can be injected later on again to the burlap. During all this time the heating can be continued until the concrete is fully cured and the heating film with or without the barrier layer can stay on the concrete - if it is a pre-cast product - as protective cladding during transport from factory to site.

In the example described the heating film has been laid on the inside surface of the mould or shuttering. It can also be used as a kind of blanket on top of the concrete. Its heating function is, of course, less prominent in such use, particularly if it is covering a pond of water at the top; however, it prevents the evaporation of water or its being blown-out by wind and warms it at the same time ensuring the desired wet curing of the concrete. For this use of the heating film both layers enclosing the patterned foil are preferably of plastic.

Figure 19:
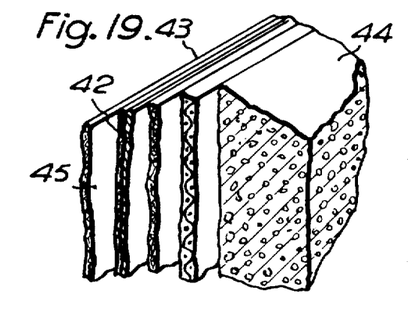
FIG. 19 illustrates one way of keeping concrete wet during curing.

The "keep-the-concrete wet" function of the film can be accentuated also if the film is used as building paper and laid, as in the previous examples, on the inside surface of the mould or shuttering. It will stick to the concrete when de-shuttering. Then as shown in FIG. 19 the whole film 42 with its moisture barrier layer 43 is then temporarily taken off the concrete 44, a sheet of moist burlap 45 is laid on the concrete, the whole film is put back on the burlap and switched on again. Any gaps in this covering (at corners or the like) are sealed up with any suitably impervious layer or material and the curing of the concrete continues within a warm humid cover. Additional provision can be made to inject water or steam to the burlap underneath the heating film.

Figure 20:
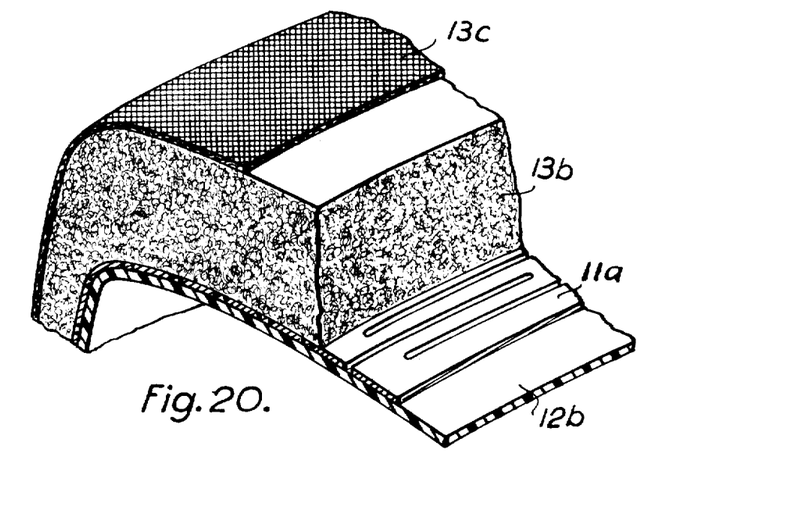
FIG. 20 is a part section illustrating a steam or moisture retaining hood used in the invention.
Figure 21:
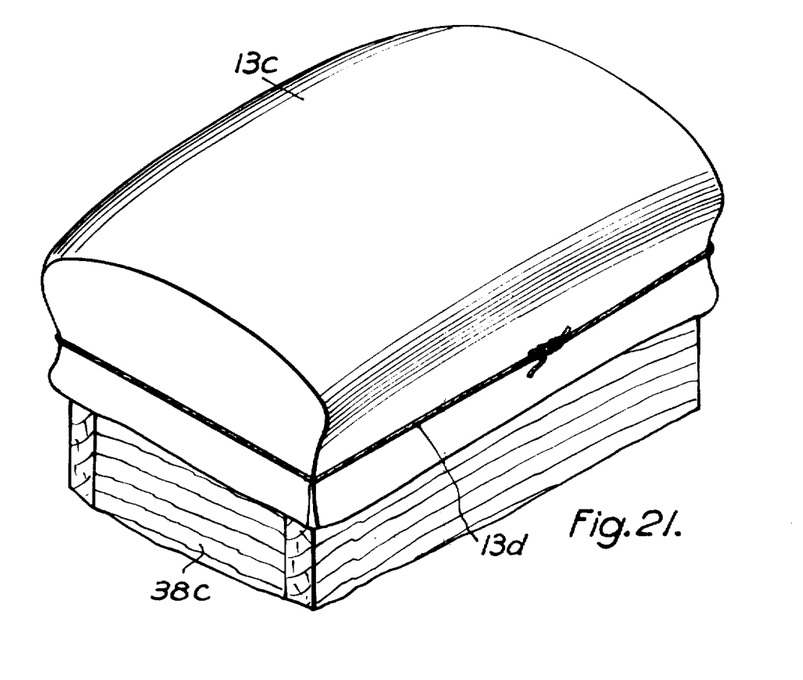
FIG. 21 shows the hood in FIG. 20 is use.

A development of this scheme which also constitutes an example of a blanket on top of the concrete as mentioned above is shown in FIGS. 20 and 24. Here the film the conductive foil pattern of which is marked 11a is sandwiched between an impervious rubber or plastics material inner layer 12b and an outer layer 13b of highly heat insulating material exemplified by foamed plastics material covered by a separate or integral weatherproof layer 13c. The whole is formed into a hood which forms a steam trap or heatable hood covering and secured to the otherwise open mouth of a mould structure marked 38c. Conveniently the hood is secured by a strap or cord 13d.

The above description shows that the heating film can have various functions in addition to that of accelerated curing by dry or wet heat. Mention has been made of its use to prevent drying out of the concrete and to keep the concrete wet, to preserve wooden formwork and to save cleaning moulds of all types, to serve as a blanket or protective cover during transport and storage and to assist in obtaining a smooth surface of the concrete. The last point needs further elucidation, it is being assumed that the heating film is used by being positioned on the inside wall of the mould and usually sticks to the concrete when the concrete is taken out of the mould, or the mould or formwork removed from the concrete.

It will be readily understood that in such circumstances scratching or other injuries to the concrete surface by the separating operation are prevented or reduced, and the concrete surface will be a fairly true replica of the adjacent heating film surface which is a glossy abrasion resistant plastic film, a coated foil or a highly calendered paper. It will therefore be as smooth as if it were polished when the heating film is stripped off it, which can be done after either the whole heat curing is complete and the film is not needed any longer on the concrete as a protective cover (see above) or immediately after de-moulding if the heating film is to be re-used at once in the same mould.

In the latter case a more durable, readily cleaned, heating film layer, such as a resin impregnated glass fibre cloth or the like, is used as the layer adjacent to the concrete.

Indeed where the film is to be re-used either as just described or in general as mentioned elsewhere herein, it may be made stronger and more resistant to handling and wear by embedding the conductive layer in glass fibre reinforced plastic so that it becomes a thin panel which can readily be handled. The conductive layer need not be midway of the thickness; by having thicker plastic on one side, the thermal insulation on that side is improved. Also before the conductive layer is embedded in the plastic it may be sandwiched between thin papers or supported on a thin paper.

A smooth natural concrete surface is not always desired; instead one or more of many other qualities may be required, such as decoration, weather resistance or resistance to other media.

The heating film caters for these cases either by using as the layer adjacent to the concrete, a layer which will impart the desired qualities to the concrete, or a layer which incorporates these qualities and is itself transferred bodily to the concrete during or after the heating period.

Figure 22:
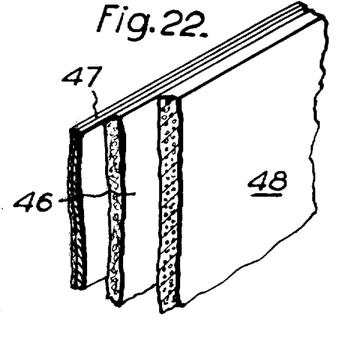
FIG. 22 illustrates the use of the film in conjunction with a layer to be transferred to the material being cured.

In the former case illustrated by FIG. 22, this layer 46 is a proper decalcomania or transfer layer as produced by the printing art in a manner itself well known. Naturally the inks or colours must be suitable for surfacing concrete. The support for the decorative materials which are transferred wet or dry, the latter for instance by heat, must be adequate as a layer of the heating film 47 and, if desired, can be a plastic abrasion resistant transparent or robust decorative film which itself is transferred together with the inks or paints.

In order to enhance the bond between the concrete and the transferred materials the back of the latter which constitutes the surface of the heating film facing the concrete can be coated with a layer 48 of cement paste or another bonding agent or a bond-promoting chemical (Hardener) such as a calcium-chloride-containing mixture, prior to pouring the concrete. This paste can not only secure the decoration, but also form an improved weather resisting surfacing of the concrete of a desired colour.

Figures 23, 24, 25, 26:
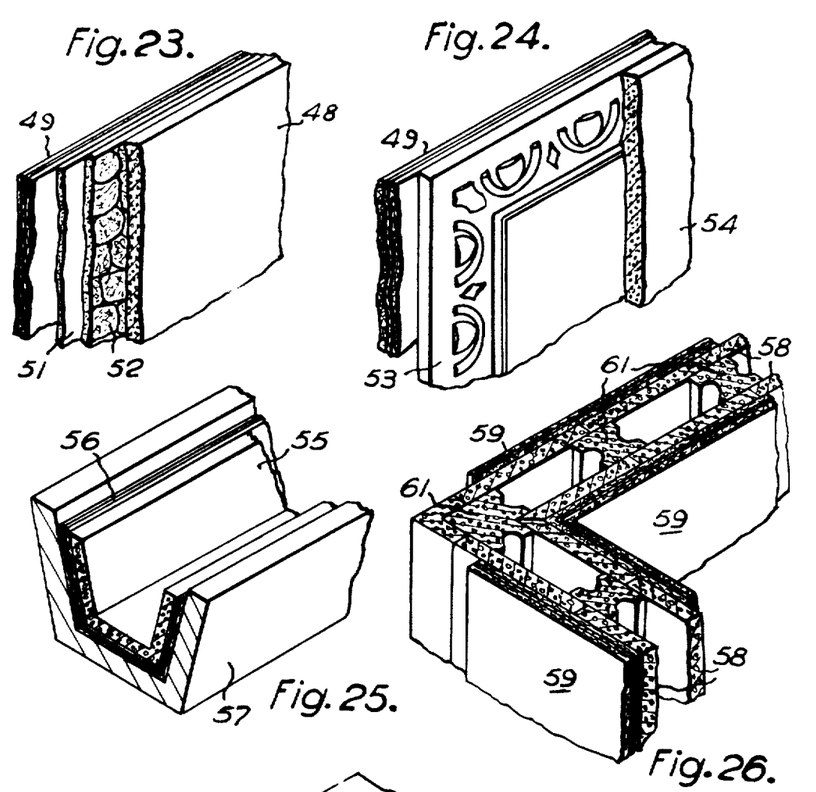
FIG. 23 illustrates a alternative type of transfer.
FIG. 24 illustrates the use of a film in conjunction with a layer which applies a relief pattern to the material being cured.
FIG. 25 illustrates the use of the invention to speed up demoulding.
FIG. 26 illustrates another way in which speeding up of the building of a wall can be effected.

Two particular types of transfer for decoration of concrete will now be described. One illustrated in FIG. 23 is a temporary support on the heating film 49 by means of a glue film 51 of a kind of irregular mosaic 52 of coloured stones and loose sand, and the other illustrated by FIG. 24 a relief-bearing layer 53 of which a replica is to be formed in the concrete. The mosaic of coloured aggregate forms a traditional concrete surface after its transfer and after the sand has been brushed off; the relief forming layer is stripped-off when the concrete has hardened. It can be made of resin (e.g. epoxy resin) impregnated glass cloth or of an elastomeric material if it has undercuts which have to flex on withdrawal. The use of a coloured cement paste 54 with which the relief layer is coated prior to application to the concrete is strongly recommended. The mosaic aggregate also may be grouted with a special mortar 48 while on the transfer layer.

The use of the film to carry a layer which is transferred to the concrete can also be applied to sealing of the concrete by means of a layer for example of a resin and hardener or a wax or other sealing material which may be transferred to the concrete to constitute a permanent or a temporary sealing coating, for instance to prevent evaporation of water from the concrete.

By taking a further step in the use of the heating film when it is placed on the inside wall of the mould, a step which can moreover be combined with the decorative or other transfer method just described, a drastic reduction of the time the mould is occupied by one pouring of concrete can be achieved. The method illustrated by FIG. 25 consists in forming only a crust 55 of concrete on the heating film 56 covering the inside of the mould 57 thin enough to cure by the aid of the heating film in a very short time, but to attain a strength to permit de-moulding. (Whether the de-moulding is carried out by removing the mould from the crust or the crust from the mould depends on the shape, the facilities available, etc.). The heating film remains with the crust and continues the heat cure until the crust is sufficiently strong to act as a shell into which fresh concrete mix can be poured, the heating film then continuing the curing of both the crust and the fresh concrete.

The formation of the crust is preferably effected by a system of pneumatic spraying (Gunite or Shotcrete system) as this saves vibrating the crust and enables it together with the heating film to support itself in a minimum of time.

In some cases, particularly when the shape of the structure to be built is so regular that a mould or formwork can be designed as an assembly of simple flat or curved sheets, it is possible to prefabricate thin concrete walls of the size and shape of such sheets and fix them together to form an unsupported shell into which the concrete is subsequently poured. An example, applied to the building of a wall, is shown in FIG. 26. Here flat pre-fabricated wall facing plates 58 of concrete each with a heating film 59 on its outside, are assembled with the aid of spacers 61 (which may also be of prefabricated concrete) and the cavities left between the plates and the spacers are subsequently filled with concrete, the setting of which and further hardening of the plates are accelerated by the use of the films 59. Thus the actual construction of a usual type of mould of steel or timber is saved altogether, and pouring of concrete can commence simultaneously into as many shells as are assembled from these prefabricated heatable thin wall-facing-pieces.

Each of these pieces has been cast on a heating film, for instance by pneumatic spraying or a vacuum process (Gunite or Vacuum-Concrete process) operating in a conveyor system as used at present for pre-casting flags and flat stones. The provisions for assembling these pieces are designed not only to fix them to each other mechanically, but also to automatically connect or facilitate interconnection of the heating films which the wall-facing-pieces carry with them on their outside or inside surface.

Even if the films are in the outside of the pieces, the casting in of the pieces ensures very intimate heat conductive contact while the atmosphere will hinder loss of heat as above noted, though the film may incorporate thermal insulation on the inside or be covered with such.

A variation of this method uses prefabricated heatable wall-facing slabs which carry the heating film not on their surface but within their thickness with only the terminals accessible. They are produced in accordance with the description relating to placing the heating film within a mass of concrete which is referred to above with reference to FIG. 3 and also further described later herein.

The heating film can - after it has served for the curing and for covering of the structure - be left as a decorative or protective facing of the wall of the structure and/or for subsequent use again, if so desired, for space heating or de-icing or for heating the concrete object itself. Alternatively, it can be stripped if it has been on the outside surface of the wall-facing pieces. If it has been on the inside surface of the wall-facing pieces it can be withdrawn like a sliding shutter or drawform during the curing before the concrete has set sufficiently to grip it but is still in a state when it will bond to the facing piece.

In all cases where the heating film is either left as a facing for long-term use or is withdrawn or stripped for repeated use the film must be made adequately robust; a dispensible film can be much flimsier and is therefor cheaper. If only the function of accelerated curing is of importance for the choice of heating film it depends on the nature of the concrete product and the circumstances of its production (quantity, timing, etc.) whether a dispensible heating film for a single or a few curings only is used or a more robust permanent one for many repeated curings.

Figure 27:
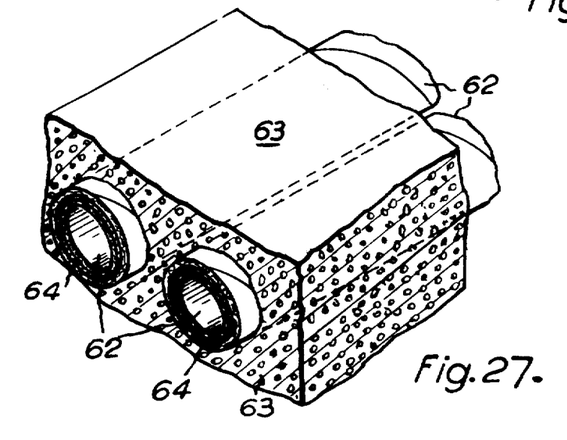
FIG. 27 illustrates the production of cavities within the material being cured.

In the production of concrete structures with large tubular cavities, of circular or other cross-section, it is often convenient to produce these cavities as illustrated by FIG. 27 by inserts 62 in the concrete 63, which may or may not be withdrawn after curing. These inserts are preferably produced as helically or concentrically wound multilayer tubes of the desired cross-section. The heating film 64 forms one of these layers, usually the first or second from the inside, while the other layers are paper or plastic film or resin impregnated glass or textile cloth laminated together into the tube during the winding process. The long wound tube is cut into pieces of the length required for an insert, and the inserts if withdrawn are usually dispensed with after one or a few uses.

Such long tubes may be produced on the lines described in my application Ser. No. 577,988 filed June 16, 1966 now matured into U.S. Pat. No. 3,516,218 issued June 9, 1970, though for the present purposes the same care to render the tubes quite hermetic is not necessary. What is described in that application regarding a heating film with rhombic repeats at the appropriate angle to bring the bridges of the pattern into lines perpendicular to the tube axis also applies here. Such tubes can in general be used as heating tubes and also as mentioned in that application be used for making heatable containers.

Inserts for cavities of other configuration as well as dispensible shells with heating film as one of the layers in the skin of the insert, e.g. as the innermost layer or as a layer near the innermost, can also be made as cardboard or papier mache products or as plastic mouldings if the quantity required is large enough to render these processes economic. The inserts may or may not be withdrawn after curing, depending on whether this is possible and desirable. Hollow pot floors can be made in this way using cardboard box inserts in conformity with the foil pattern.

A particular advantage of hollow floors produced by the aid of embedded tubes or hollow inserts of other configuration carrying heating films which are left in position is that not only do they accelerate curing when the floor is first cast, but as mentioned elsewhere herein, that the films can thereafter be used as heating elements. Since a concrete floor is of considerable mass it then serves as a storage heater, the heat continuing to be gradually released into the building after the films are switched off. It will also be clear that the tubes can be used to carry hot air by which the heating effect of the films is augmented.

In many cases, particularly when concreting is done on an horizontal area which is not accessible from below, such as when constructing roads, foundations, pathways, etc. or large flat pre-cast structures, the heating film (see 19 in FIG. 3 described above) is laid like a building paper on or near the bottom of the area or on the bottom of the mould (which may be no more than a trench with a consolidated surface of hard core), and concrete is poured over it. The film remains there. It is not recovered, but in some cases may be re-used, for instance for de-icing, provided care is taken to keep the terminal areas (busbars) accessible at at least one place, and this also applies to other cases where the film is left in the concrete.

In other cases the heating film is positioned on the shuttering of the walls so that it forms a wall heating panel, for instance for space heating, after it has served to accelerate the curing of the concrete and to speed up de-shuttering.

In almost all the examples given so far the heating film has been positioned within or on the mould structure. Certain measures will now be described which are to be recommended when the film is to be embedded within the concrete as may be desirable to achieve more even heat propagation throughout. In this case the film is almost always a dispensible one in the sense that it remains in the concrete and is not recovered.

The great advantage of placing the heating film inside a concrete structure is not only its quality and suitability as a heat source for this function, but the fact that it can be positioned where desired for best exercising this function. Thus instead of extending it across the cross-section of the material as at 15 FIG. 3, it may be better adapted to the particular case to distribute it in skeletal though still extended form within the material to be cured.

There is, however, a problem arising from the possibility that the adhesion of the heating film to the concrete and or the cohesion of the layers of the film to each other may be weaker than the cohesion of the concrete, and the heating film would thus form a likely area of rupture or shear.

The present invention provides for three measures to meet this possibility.

The first is to impregnate and coat the heating film with epoxy resin or other resins and adhesives to give it both strong cohesion and adhesion to the concrete. The adhesive coatings should be formulated so as to react with the concrete towards a strong bond.

The second is to slit the heating film in the gaps between the foil arms and to hold the arms apart so forming a skeletal structure, by inexpensive spacing means during the pouring and vibrating of the concrete.

Figure 28:
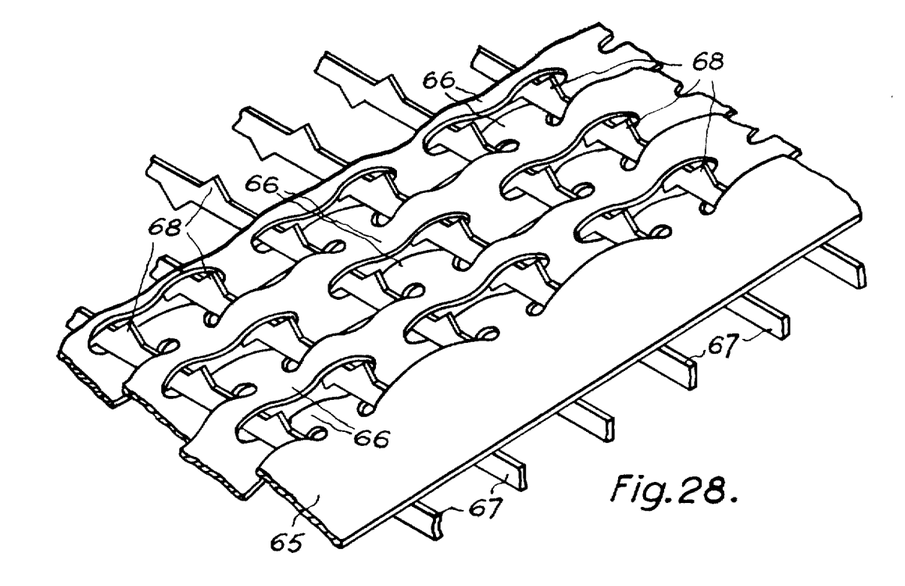
FIGS. 28, 29 and 30 illustrates arrangements for distributing film within the material being cured.

By way of illustration FIG. 28 shows a simple example in which the busbars are shown at 65 and alternate arms 66 of the pattern are bowed in opposite directions from the general plane the film would occupy in the flat and so held by spacers 67 notched at 68 along these edges to hold them in engagement with the busher arms. The spacers 67 can for example be of cardboard. Alternatively to individual spacers, steel wool or some similar assembly of steel wires could be used to hold the arms spaced, or a rough pre-cast concrete tree-like structure equivalent to the spacers i.e. joined together in positions which would not prevent the arms of the pattern being threaded over the "limbs" of the "tree." Thus structures each having a longitudinal stem parallel with the busbar could be used, threaded in from opposite edges and each extending half-way across could be used. With spacers of this character the concrete can flow between the arms of the heating film and form a self-coherent interlocking structure.

Whether the spacing means can be withdrawn after the vibrating has been done depends on its particular configuration. If a rough pre-cast concrete spacing tree is used the point does not arise; it is left in the concrete which unites with it on setting.

The third measure is to produce, for instance by a pneumatic spraying process, a concrete cladding round the slit and spread-out arms of the heating film, so that it forms a robust tree-like heating device which stands up to rough handling by unskilled labour when it is put in a mould and when concrete is poured on and vibrated round it; it will even stand up to being vibrated bodily in some cases.

Figure 29:
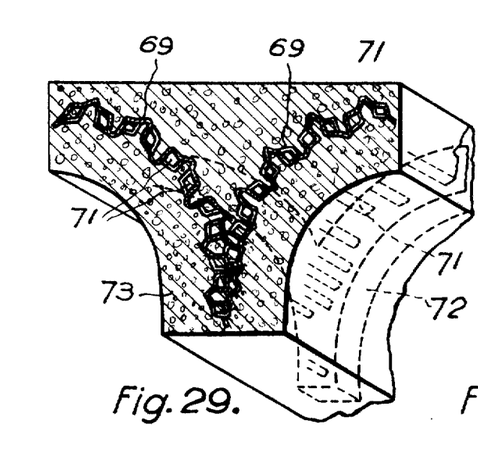
Figure 30:
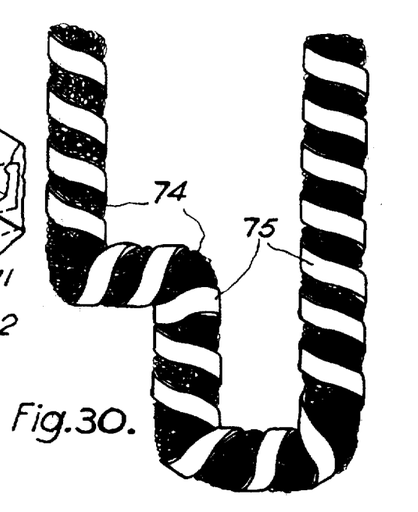

Examples of arrangements of this character which would be left in place are illustrated in FIGS. 29 and 30. In FIG. 29 the films 69 while remaining extended widthwise have the arms of the pattern bowed in opposite directions as in FIG. 28, and the limbs or branches 71 of the pre-cast concrete tree (seen in section) extend through the spaces between the arms, these limbs or branches extending from two main limbs or trunks 72 branching from a common base portion to match a more-or-less T-sectioned body 73 of concrete the curing of which is to be accelerated by the heating film. It will be seen that the distribution of the film is in a skeletal form which matches the section of the body 73; if it were thought that there is a part near the top centre of the section which has no film near enough, the tree could have another main trunk.

In FIG. 30 a branched structure 74 of tangled steel wires or steel wool has the film 75 in the form of a tape or ribbon, i.e. of great length and relatively narrow width wound round it while remaining extended widthwise, the shape of the branched structure being suited to the shape of the concrete article or mass.

As the heating film usually remains intact in the concrete structure, the possibility arises of using it again after it has served its purpose of accelerating the curing of the structure. Thus the film may be used to heat floors, special areas in roads, pipes, bridges, manholes and other drainage equipment, and generally wherever such a heatable part is advantageous. The heating film, its positioning and terminals must be designed for this later function as well as for the first one of accelerated curing.

A further advantage of the provision of a heating film for accelerated curing of a concrete structure and particularly of heating films placed inside the structure and/or on the structure so that there is only a relatively thin layer of concrete to be penetrated by the heat flow from each heating film is the improvement of the strength of the cured concrete obtainable by a more perfect hydration of the cement particles. This improvement is achieved by energising the heating films over short periods followed by periods when the films are unenergised so that there is initiated at least during a critical time of hardening a cycle of shock heating and cooling causing expansion and contractions in the cement whereby conditions are produced in which capillary spaces or minute zones of contact between the water and cement particles not yet hydrated are likely to be established. The energy level employed should be below that which would cause the water to boil. This can be readily controlled e.g. by thermostats to keep the highest temperature of the heating film of the critical layer in the structure below 100°C. if the curing takes place under atmospheric pressure or below the corresponding boiling point, if it takes place under higher pressure. This method of cyclic shock heating and cooling is a special feature of the present invention and is not only applicable to concrete, but to any curable material in which the heating film is used to accelerate the reaction between a liquid and a solid.

A special use of the tree-like prefabrication of the configuration of the heating film is its use inside very large concrete structures, such as dams or other civil engineering works. Hitherto, the use of heating means has not appeared appropriate, as their ratio of surface to volume is so small that the erothermic reaction of the setting of the concrete presents a problem of cooling rather than of heating. A great saving in their cost of construction can, however be achieved by the use according to the present invention of heating film in these civil engineering structures.

According to this feature of the invention the structure is built by placing heating film for instance in or with the above described tree-like heating film carriers within a mould, surrounding them with large aggregate such as rocks which constitute a heat sink so that only narrow voids are left, filling the voids with an uncured grout, and then supplying electrical energy to the film at the requisite rate for the requisite time. The mould may be constituted by heatable wall-facing pieces as described earlier, to form a surface cover over the whole structure, and the grout may be pumped in through pipes leading to grouting hoses previously placed in the moulds so that it flows into all the voids left in the film and aggregate assembly in the mould.

Figure 31:
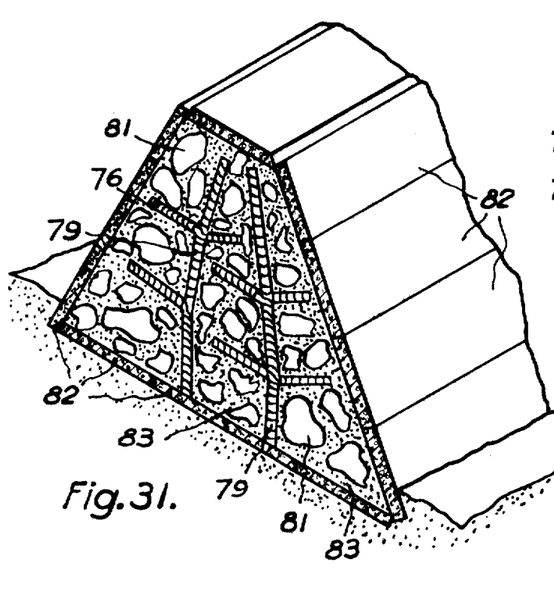
FIG. 31 illustrates the application of the invention to the production of bodies of very large bulk.
Figure 32:
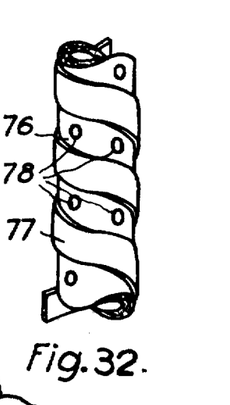
FIG. 32 is a detail of FIG. 31.

An example is shown in FIGS. 31 and 32. In these figures grouting hoses 76 suitably of paper have a tape like heating film 77 wound helically round them. Widthwise the film is still extended. These hoses are disposed in tree-like formations 79 within the cross-section of a dam which is completed by rocks 81, heatable wall facing pieces 82 and the grouting 83. Between turns of the film the paper tube may have perforations such as 78 for the discharge of the grout.

This grout pumping is by itself a method known under the name of Intrusion or Grouted Concrete. The novel features of the present proposal - apart from the use of the heating film in its various ways of application - is the building of a structure of thermally inactive materials to form a limited heat sink so that the exothermic material is present substantially only as a binder in narrow cavities which have a large surface to volume ratio. The heat which is conducted away from the setting concrete into the solid rocks and large aggregate which is wetted by the concrete does not therefore raise the temperature of the concrete, and heat for accelerating the cure can be supplied both by the heating film trees from the inside and by the heatable wall-facing pieces from the outside.

What has been considered until now a problem of cooling to prevent too high a temperature inside a large mass undergoing any exothermic reaction has been transformed by the present invention into a task of accelerated heat curing by energy supplied to the mass from outside. This results in a quicker and cheaper construction.

As mentioned earlier in this specification, the present invention has been described mainly in its application to concrete by way of example. Professor D. F. Orchard's book "Concrete Technology," published by John Wiley, New York, N.Y. 1962 may be referred to if further details of well known processes mentioned in this specification are desired.

As had also been mentioned earlier the present invention is not limited to concrete, but can be applied with suitable variations to other materials, in particular, so-called plastics materials.

The heating film can be embedded in laminates, castings or mouldings or be placed on or in the walls of the (cold) moulds or on the laminates and accelerate the curing of such materials if the curing of the mixture or compound is based on a chemical reaction - say, between a resin and a hardener - which is accelerated by heat. It shows particular advantages if the curing can be done without higher pressure. Examples of uses of plastics materials to which the invention is applicable have been given earlier herein.

It is believed that the examples above described with particular reference to concrete will also serve to make clear the application of the invention to plastics materials without further description since basically the mode of operation is the same. The difference will reside principally in the materials of the moulds, the times and the temperatures all of which are matters within the province of those skilled in the art. In the particular case above described with reference to FIGS. 31 and 32 it may be convenient to fill the voids by gravity if the plastics material is sufficiently easily pourable, and the hoses may be dispensed with.

Reference has earlier been made to a viewing box by the aid of which preliminary investigations can be made into the various factors which effect curing in any particular case. Thus, the best configuration best spacing of parallel layers of the film, progress of heating and of flow of the material, can be experimentally studied in cross-sectional models. A container with at least one window enabling a cross-sectional view of the model layout to be taken, for instance having at least one temperature wall parallel to the cross-section of the heating film configuration to be investigated, constitutes a viewing box for visibly observing the heating effect, and such a box is a convenient experimental tool for optimixing many parameters of the arrangement, such as location of heating films within the material and on its boundaries, loading of the film or particular areas of the film in Watts per unit area, distribution and structure of the material, container shape and so forth.

The observation of the temperature rise at critical points in the viewing box can be carried out by the provision of thermocouples or other temperature sensing devices at these points, and where no visible change in the material occurs during the proposed heating cycle, the material or films can be coloured with temperature indicating chemicals (dyes or pigments).

Such a viewing box can indeed be arranged for microscopic examination so that for example the effects above described of pulsating the energy supply to the film or films can be closely observed and such similar close observation in the case of concrete can be facilitated by the use of coloured water for hydration; the use of coloured substances may also be possible with other materials. A viewing box is especially useful when the film is distributed within the mass of the material in close parallel layers or in tree-like and similar formations, where there is a risk of undesirable heat concentration.

I claim:

1. The combination of molding apparatus adapted to receive a high-density body of curable material the solidification of which can be accelerated by heat and which requires a further cure after initial solidification, comprising an electric resistance heating film positioned in extended form disposed in position to receive at least a portion of the body adjacent to one side of the film, means disposing during the curing cycle the film in good heat conductive relationship over its whole surface to contact the body of material to thereby induce by thermal conduction into the body a temperature greater than ambient, the film comprising a disposable element adapted for only a temporary use including a heater element with a conductive layer of minute thickness and of an area distributed over and occupying at least the major portion of the area of the film, electrical coupling means for connecting the film to a supply of electrical energy, and including mold structure separate from and removable from said film while disposed in heat conductive relationship on said body including removable mold elements to hold the body in a predetermined shape during only the initial stages of solidification and cooperative mold and film structure causing said film to remain in thermal contact with said body after said mold is removed.

2. A combination as set forth in claim 1 wherein the heating film is temporarily affixed to the mold structure by an adhesive layer which at an elevated temperature attainable by energizing the film offers a smaller resistance to displacement of the film by sliding in its own plane than to forces in a direction which would strip the film from the mold structure.

3. Heat treating apparatus for receiving a body of curable material, the solidification of which can be accelerated by heat, comprising in combination, mold structure to receive said material and hold it in a predetermined shape, an electrical heating film with an extended surface area with a conductive area of minute thickness occupying a major portion of the surface area of the film, means disposing said surface area in place to receive in good heat conductive relationship and holding the film surface in contact with said body with at least the main bulk of the body on one side of the film, insulating means disposed for hindering the conductive transmission of heat over the whole area of the film in a direction away from the main bulk of said material, said film and insulating means having structure to develop heat and dissipate it substantially uniformly over a wide area into the mold structure to encounter main bulk of the body of material when in place and to direct thereinto the heat in a direction generally perpendicular to the surface of the film, an electrical source, and means connecting the electrical source to heat said film for a time determined by a predetermined law.

4. Apparatus as set forth in claim 3 wherein the film is removably disposed on the inside facing of the mold structure so that the mold may be removed leaving the film in heating contact with the body of material.

5. Apparatus as set forth in claim 3 including means introducing moisture into contact with the body during the curing period.

* * * * *